Figure 2:
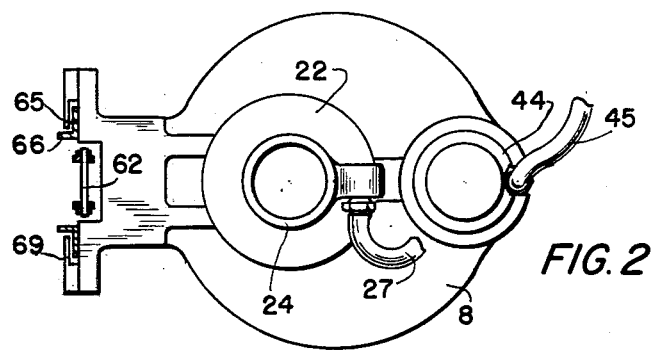

Oct. 27, 1964        P. A. LINCOLN        3,154,158
                      ROCK DRILL
Filed Feb. 15, 1962                    3 Sheets-Sheet 1

INVENTOR
PAUL A. LINCOLN
BY
David W. Tibbetts
HIS ATTORNEY

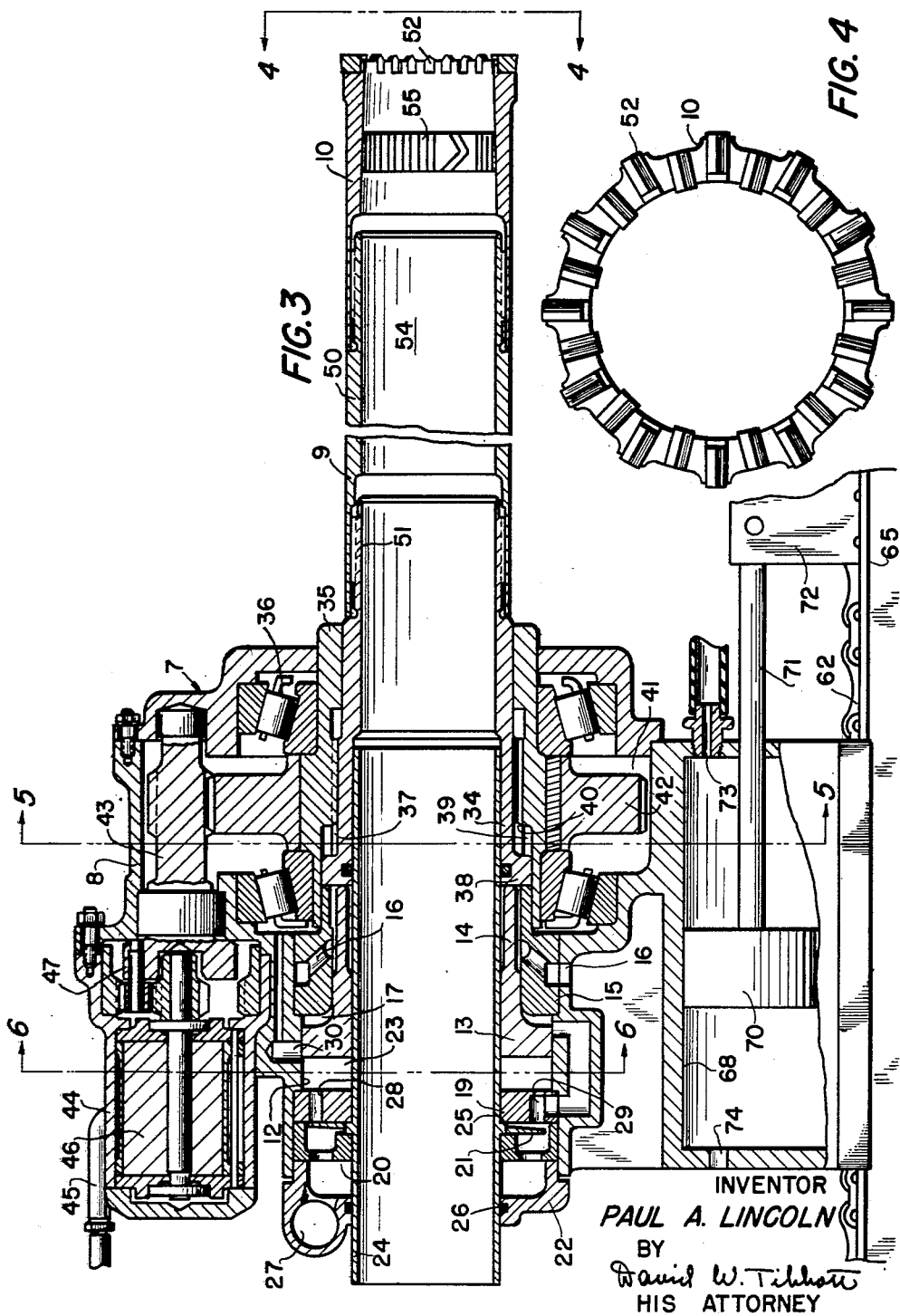

INVENTOR
PAUL A. LINCOLN
BY
David W. Tibbott
HIS ATTORNEY

United States Patent Office 3,154,158
Patented Oct. 27, 1964

3,154,158
ROCK DRILL
Paul A. Lincoln, Bloomsbury, N.J., assignor to Ingersoll-Rand Company, New York, N.Y., a corporation of New Jersey
Filed Feb. 15, 1962, Ser. No. 173,389
6 Claims. (Cl. 175—135)

This invention relates to a compressed air actuated drilling apparatus particularly adapted for drilling in rock and similar hard materials.

The conventional rock drill is actuated by a compressed air actuated mechanism delivering a series of percussive impacts to a bit which drills a hole through rock by pulverizing, comminuting and disintegrating the entire volume of rock removed from the hole.

The pulverization of the entire volume of rock in the hole is wasteful of energy and power since the same hole can be drilled by cutting a cylindrical kerf or trench in the rock and removing the resulting core of rock as a substantially solid mass, thus eliminating the waste of energy expended in pulverizing the rock core. Furthermore, in certain drilling applications, after the rock is removed from the hole, it is more desirable to have it in a substantially solid form rather than in a pulverized condition.

Heretofore, conventional core drills have been of the slow rotary type wherein a bit is slowly rotated and steadily pressed axially into the earth. Such drills have a much slower drilling rate in rock than the conventional percussive type rock drill. Furthermore, this type of drill usually has a bore or cavity opening upwardly from the cutting end of the bit for a short limited distance to receive the core as the bit penetrates the earth. This limited length of bore or cavity in the bit is undesirable as it necessitates the periodic removal of the bit from the hole being drilled to empty the core from the bore or cavity before continuing the drilling operation.

The principal object of this invention is to provide a rock drill which combines the fast drilling rate of the conventional rock drill with the advantages of a core drill and eliminates the disadvantages of prior core drills.

Further important objects of this invention are: to provide a rock drill that cuts an annular kerf or groove in the earth whereby the core surrounded by the kerf can be removed as a substantially solid mass; to provide a core drill having a fast drilling rate comparable to a percussive rock drill; to provide a core drill which is driven into the earth by a series of percussive impacts; to provide a core drill which does not have to be periodically emptied of the core during a drilling operation; to provide a rock drill which is more efficient in conserving energy than is true of prior art rock drills; and to provide a novel, compact, efficient and fast rock drilling apparatus.

In brief, these objects are attained in a drill apparatus having a tubular bit mounted on the front end of an elongate tubular drill steel and a power head connected to and carrying the rear end of the drill steel, this power head being operative to apply a rapid series of percussive impacts to the drill steel and bit and, simultaneously, to rotate the drill steel and bit at a slow speed, so that the drill cuts an annular trench or kerf in the earth and the resulting core of earth rises into a central passageway extending through the tubular bit, drill steel and power head. The drill apparatus is further provided with a means for applying a uniform and selected axial force to the drill effective to push the drill against the bottom of the hole continuously during the drilling operation.

Figure 1:
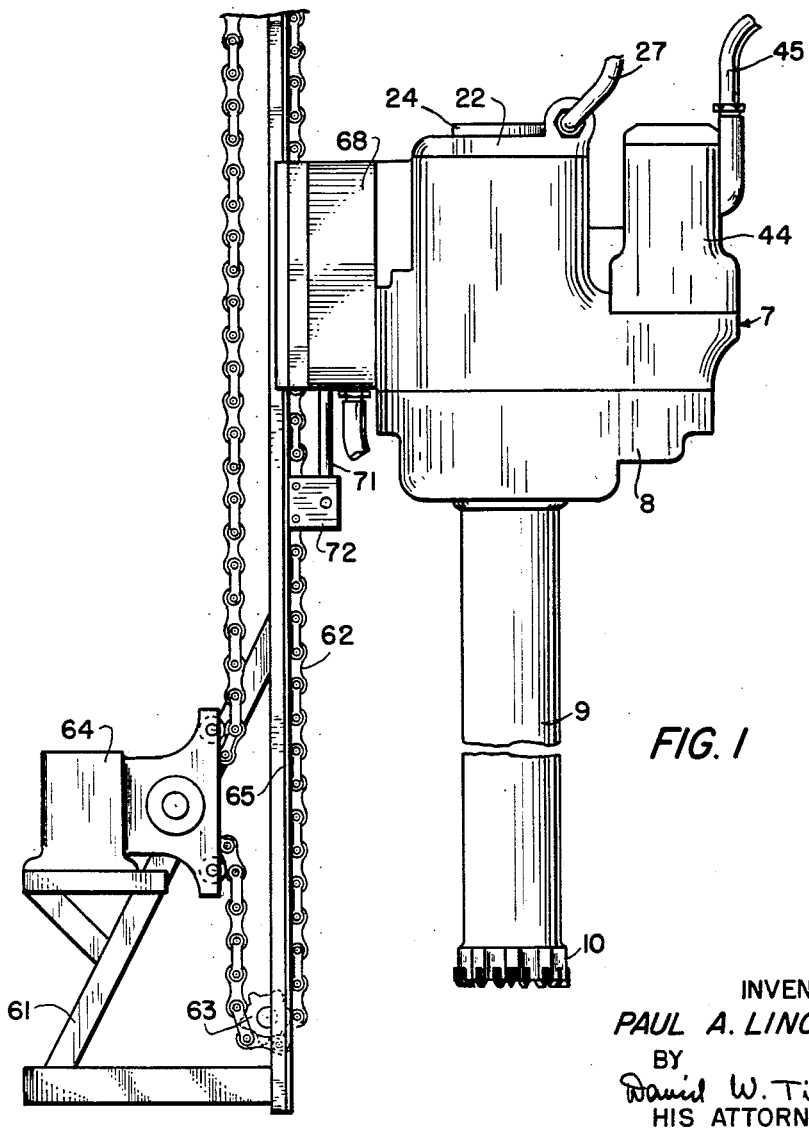
Figure 7:
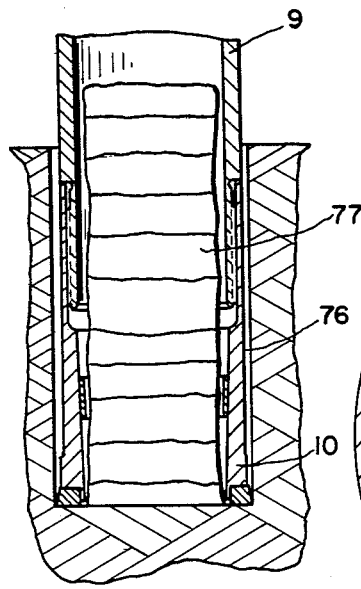
Figure 5:
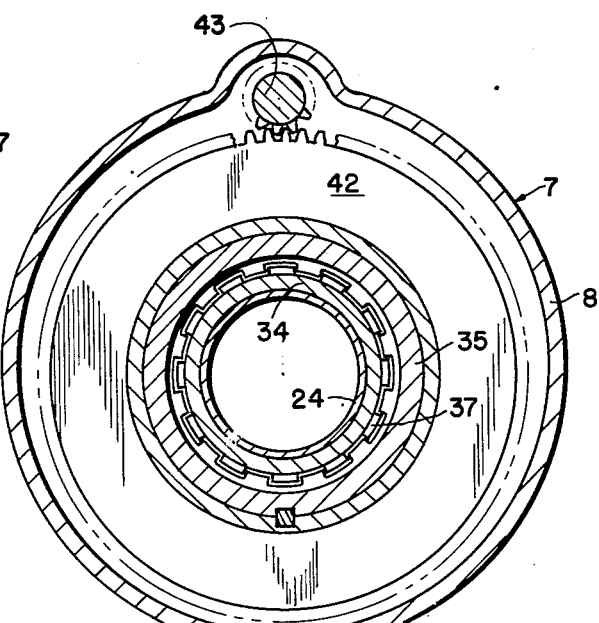
Figure 6:
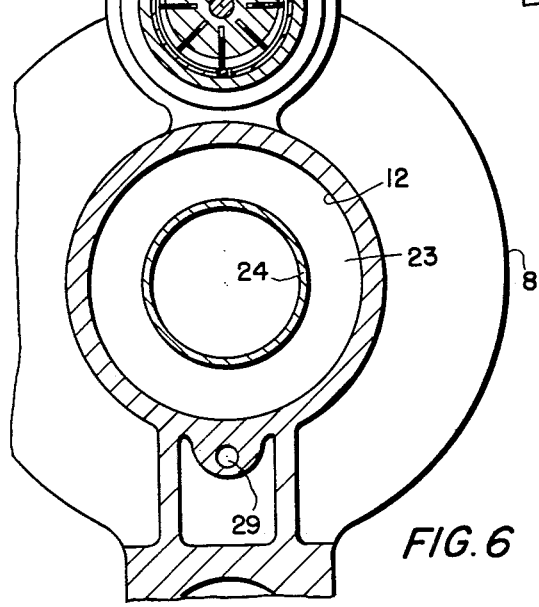

The invention is described in connection with the drawings wherein:

FIG. 1 is a somewhat schematic and cut-away elevational view of the drilling apparatus of this invention;
FIG. 2 is a top plan view of FIG. 1;
FIG. 3 is a longitudinal section on an enlarged scale of the drilling apparatus of FIG. 1;
FIG. 4 is an enlarged end view of FIG. 3 taken on line 4—4;
FIG. 5 is a section taken on line 5—5 of FIG. 3;
FIG. 6 is a section taken on line 6—6 of FIG. 3; and
FIG. 7 is a longitudinal section showing the drill steel and bit drilling a hole in the earth.

*Drill*

The drill 7 includes a power head 8 comprising a frame or body, also designated 8, a tubular drill shaft or steel 9 attached at its rear end to the power head 8 and an annular drilling bit 10 fixed to the front end of the drill steel 9. The power head 8 delivers a series of percussive impacts to the drill steel 9 and simultaneously rotates the drill steel during the drilling of a hole in the earth.

The power head body 8 includes a cylinder 12 containing a tubular T-shaped hammer or piston 13 reciprocating therein. The piston includes an enlarged head, also designated 13, sliding on the walls of the cylinder 12 and a reduced diameter front nose 14 slidably engaged in an annular bushing 15 which is fixed in the front end of the cylinder 12. The piston nose 14 is externally fluted and the bushing 15 contains venting ports 16 for preventing any build-up of air pressure at the front of the piston nose 14 during its reciprocation in the bushing 15. The bushing 15 cooperates with the piston nose 14 to close the front of the cylinder 12 and form a piston retraction chamber 17 disposed between the piston head 13 and the bushing 15.

The rear end of the cylinder 12 is closed by a multiple part flip-flop valve cage 19 which is fixed in the cylinder 12. The valve cage 19 includes a front plate, also designated 19, a perforated rear plate 20 spaced rearwardly from the front plate 19 and a washer-shaped flip-flop valve vane 21 interposed between the two plates 19 and 20. The valve cage 19 is secured in the cylinder 12 by a backhead 22 which is mounted at the end of the cylinder 12. The valve cage 19 forms a piston advancement chamber 23 located between the piston head 13 and the valve cage 19.

A hollow tube 24 extends through the backhead 22, the valve cage 19 and the tubular piston 13 to close the interior of the piston advancement chamber 23. The piston 13 slides on the tube 24 with a running fit therebetween. The tube 24 is fixed in place by means of an enlarged annular rib 25 which seats between the two plates of the valve cage 19 and is sealed to the backhead 22 by an O-ring 26 which is disposed in an internal groove in the backhead 22 and snugly encircles the tube 24.

The piston 13 is reciprocated in the cylinder 12 by means of compressed air which is fed through an inlet 27 in the backhead 22 and is admitted alternately to the advancement chamber 23 and the retraction chamber 17, by the flip-flop valve vane 21. The flip-flop valve 21 alternately closes a passage 28 provided in the front valve cage plate 19 leading into the rear advancement chamber 23 and a passage 29 passing through the cage plate 19 and the body 8 into the front retraction chamber 17. Air is exhausted from the cylinder 12 by an exhaust passage 30 disposed in the cylinder 12 about midway of the reciprocating travel of the piston 13.

The operation of the piston 13 and flip-flop valve 21 is well understood in the art. The valve 21 is "current actuated" which means that it is moved or rocked between alternate positions closing one or the other of the passages 28 and 29 by the sudden reduction of pressure in the particular passage which is open, resulting from the air being exhausted from the piston chamber connected to that open passage. In other words, when the valve 21 is in the position shown in FIG. 3, it admits compressed air to the retraction chamber 17, causing the piston 13 to move rearwardly. As the exhaust passage 30 is uncovered by the piston 13, the air pressure in the retraction chamber 17 and the connected passage 29 is suddenly lowered, creating a differential of pressure on the opposite faces of the valve 21 which snaps or rocks it closed over the passage 29. At the same time, the rearward movement of the piston 13 in the cylinder 12 compresses the air in the advancement chamber 23 which aids in snapping the valve 21 to its alternate position. In the new position of the valve 21, compressed air is admitted to the advancement chamber 23 through the passage 28, causing the piston 13 to reverse its movement and begin an advance stroke.

The power head body 8 carries a tubular anvil 34 which slidably receives the front end of the tube 24 and is mounted in front of the bushing 15 for limited axial sliding movement. The tubular anvil 34 is axially aligned with the piston 13 and located to be struck by the piston during its forward stroke. Thus, the reciprocating piston 13 applies a rapid series of percussion impacts or hammer blows to the anvil 34 in a forward axial direction.

The anvil 34 is slidably and concentrically mounted in a rotating hub 35 which is rotatably mounted in roller bearings 36 disposed in the power head body 8. In addition, the anvil 34 is keyed or splined in the hub 35 by means of external splines 37 engaging corresponding flutes in the hub 35, so that the rotation of the hub 35 correspondingly rotates the anvil 34.

The anvil 34 is limited in its reciprocating travel by means of a flaring annular enlargement 38 integrally mounted on the rear end of the anvil 34 and sliding in an annular space 39 disposed between the front of the bushing 15 and an internal shoulder 40 formed on the hub 35.

The power head body 8 is formed to provide a large gear case chamber or space 41 surrounding and containing the hub 35 and bearing 36. A large rotary drive wheel or ring gear 42 is located in the gear case chamber 41 and is fixed and keyed on the hub 35. The ring gear 42 is driven by a pinion 43 journaled in the power head body 8 adjacent the periphery of the ring gear 42. The pinion 43 is driven by a conventional compressed air motor 44 mounted on the body 8 and having an air inlet 45 connected to a compressed air source (not shown), a rotor 46 and a set of planetary gears 47 interconnecting the rotor 46 to the pinion 43. Since the air motor 44 and its planetary gears 47 are conventional and well understood in the art, there is no purpose in further describing this structure.

It will be noted that the exhaust passage 30 of the impact piston cylinder 12 extends through the body 8 and opens into the gear case chamber 41 housing the ring gear 42 and pinion 43. Normally, the compressed air fed to the inlet 27 for reciprocating the piston 13 contains entrained oil for lubrication purposes and the exhaust of this entrained oil into the gear case chamber 41 serves to lubricate the moving parts therein.

The tubular drill steel 9 consists of one or more sections 50 of thin walled tubing interconnected together at threaded joints and threaded onto the front end 51 of the anvil 34. As seen in FIG. 3, the front end 51 of the anvil 34 is an externally threaded male member which threads into the internally threaded rear end of the drill steel 9. Likewise, the annular bit 10 is provided at its rear end with internal threads which thread over the externally threaded front end of the drill steel 9.

A series of radially extending cutter inserts 52, composed of a suitable hard material, such as tungsten carbide, are fixed in the front edge of the bit 10. These inserts 52 are spaced angularly around the front edge of the bit, and, alternately, project inwardly beyond the inside of the bit and outward beyond the outside of the bit. In other words, the inserts 52 are successively arranged about the bit 10 so that alternate inserts project radially inwardly beyond the interior of the bit 10 and the other inserts, between the inwardly projecting inserts, project radially outward beyond the exterior of the bit 10 so that the bit 10 cuts an annular kerf or trench which is wider than the wall of the bit 10, to provide the bit with clearance to pass through the annular trench as it drills.

As an alternative embodiment, rather than staggering the cutter inserts 52 as shown in the drawing, each insert may be elongated sufficiently to project radially beyond both the interior and exterior of the bit 10. In this embodiment, the length of each insert will correspond to the width of the annular trench cut by the bit.

The bit 10, drill steel 9, the anvil 34 and the tube 24 are axially aligned to provide a central core passageway 54 adapted to receive the core of rock or earth during the drilling operation. Since this passageway 54 is open at its upper end, there is no limit on the distance that the core can rise through the passageway during the drilling operation.

During the drilling of a hole, some means must be provided for removing the cuttings of pulverized rock or earth from the bottom of the annular trench. This can be accomplished by using conventional means.

The bit 10 contains a conventional split-ring core catcher 55 which automatically grasps the core as it rises through the passageway 54 and prevents the core from dropping back through the bit when the drill is lifted from the hole at the end of a drilling operation. The bit 10 is provided with interior walls which are slightly tapered to converge in a downward direction. The weight of the core on the core catcher 55 presses the core catcher downward in the bit 10 and the tapered interior of the bit 10 cams the core catcher more tightly around the core, thus preventing the core from dropping when the drill is lifted from the hole, while allowing the core to rise in the pasageway 54 freely.

*Drill Support*

The drill apparatus shown in FIG. 1 of the drawing includes a conventional drill tower or support 61 carrying a drill feeding conveyor chain 62 riding on sprockets 63 and driven by a suitable chain driving motor 64 mounted on the drill tower 61. The drill tower 61 also includes a trackway 65 formed by a pair of angle bars 66 extending parallel to and located on opposite sides of a run of the feed chain 62, with one leg of each angle bar 66 extending outwardly of the chain 62. As is well understood in the art, the drill tower 61 may take various forms other than that shown in FIG. 1 and may be mounted on a vehicle (not shown) such as a truck or tractor for transporting the drill apparatus between drilling locations.

*Drill Biasing Means*

A drill biasing air cylinder 68 is integrally fixed on the power head body 8 and is slidably mounted on the trackway 65 by means of a pair of inwardly turned L-shaped flanges 69 interengaging around and against the underside of the outwardly extending legs of the trackway angle bars 66, as seen in FIG. 2. The air cylinder 68 includes a reciprocating piston 70 having its piston rod 71 pivotally connected to a bracket 72 fixed on the feed chain 62. The front end of the cylinder 68 includes an inlet 73 connected by a hose to a compresed air source arranged to admit a predetermined pressure into the front end of the cylinder 68 causing the cylinder 68 to be biased forwardly relative to the piston 70 with a predetermined force. This uniform air pressure will normally be obtained by using an adjustable pressure limiting valve (not shown). The rear end of the cylinder 68 is vented at 74.

The cylinder 68 serves as a yieldable biasing coupling between the drill 7 and the drill tower 61 which acts to press the drill 7 against the bottom of the hole being drilled with a uniform and predetermined force, irrespective of the movements of the feed chain 62. It is very desirable to have this drill biasing force remain at a substantially uniform selected value to prevent damaging the bit 10 and its inserts 52, since it is impossible to control and keep the drill biasing force within a uniform selected value using merely the feed chain 62 to apply the force to the drill 7. Hence, the air cylinder coupling 68 is very important to the successful use of the disclosed drilling apparatus.

*Operation*

Before starting the drilling operation, the drill tower 61 is positioned adjacent the prospective hole to be drilled, a drill steel 9 and drill bit 10 are threadedly connected to the power head 8 and appropriate air hoses are connected between a source of compressed air and the various air inlets of the drill apparatus. The compressed air supply for the air inlet 73 of the air cylinder 68 will pass through a suitable pressure limiting valve (not shown) which can be adjusted to maintain the air pressure in the air cylinder 68 at a uniform selected value.

After the setting-up operation of the drill apparatus is completed, the drilling operation can be started. Initially, the feed chain motor 64 is started to lower the drill 7 until the drill bit 10 engages the earth and the air coupling piston 70 is positioned about midway of its travel in the air cylinder 68. Compressed air is admitted to the cylinder 68 at a selected pressure required to bias or press the drill downwardly against the earth with the desired force. The cylinder 68 will continue applying this selected force to the drill even though the piston 70 moves back and forth in the cylinder 68 during the feeding of the drill.

Compressed air is admitted to the drill 7 causing the piston 13 to apply percussive impacts to the anvil 34 and the air motor 44 to simultaneously rotate the anvil 34, thus causing the drill steel 9 and drill bit 10 to be simultaneously rotated and hammered axially into the earth. For example, a suitable rotation speed for a 6 inch diameter bit could be 30 r.p.m. It will be understood that the feed chain motor 64 is operated at a rate to feed the drill in step with its hole cutting rate, so that he drilling biasing piston 70 remains approximately midway in the air cylinder 68. Conventional means is used for removing the cuttings of rock and earth from the bottom of the hole.

FIG. 7 is a view of a typical drilling operation. As the bit 10 cuts an annular trench, designated 76, the bit 10 and drill steel 9 passes axially through the trench 76 and the resulting core of earth designated 77 in FIG. 7, rises in the passageway or bore 54 of the bit 10 and drill steel 9. Under normal circumstances, the impacts of the drill 7 against the bottom of the hole being drilled breaks the core 77 into a series of separate stacked segments, instead of a solid column from bottom to top. Due to this normal segmentation of the core 77 as it forms, it may rise through the passageway to a somewhat greater height than the earth surrounding the drill steel 9.

As the drill 7 eats deeper in the earth, the power head eventually nears the surface of the earth. At this time, the drilling operation is stopped, the drill steel 9 is disconnected from the anvil front end 51 and an additional section 50 is added to the drill steel 9 whereupon the drilling operation can again proceed. This addition of drill steel sections 50 is repeated until the hole being drilled reaches the desired depth. Thereafter, the drill is lifted from the hole resulting in also removing the core 77 from the hole, this latter result being brought about because of the action of the core catcher 55 in grabbing and preventing the core 77 from dropping from the drill steel 9.

While in accordance with the patent statutes a preferred embodiment of the invention has been illustrated and specifically described in detail, it should be recognized that the invention can be changed in various ways and aspects without changing the novel concepts of the invention and, therefore, this invention is not considered to be limited to the described embodiment.

Having described my invention, I claim:

1. A compressed air actuated drill apparatus comprising: a frame containing a cylinder; an annular piston adapted to reciprocate in said cylinder; a tubular anvil slidably mounted in said frame and arranged to be struck by said reciprocable piston; valve means for admitting compressed air into said cylinder for causing said piston to reciprocate therein; a tubular drill steel having one end connected to said anvil; an annular drill bit mounted on the other end of said drill steel; and a tube fixed in said frame and extending centrally through said cylinder and piston, said tube slidably engaging said anvil and aligned with said tubular drill steel whereby a core moving through said drill steel during the drilling of a hole can pass freely through said anvil and tube.

2. The drill apparatus of claim 1 including: a rotary drive wheel rotatably mounted on said frame and slidably keyed to said anvil so that said anvil, drill steel and bit is rotated by the rotation of said drive wheel; and power means connected to rotate said drive wheel during the drilling of a hole.

3. The drill apparatus of claim 2 including: a feed means for feeding said frame axially during a drilling operation; and a drill biasing coupling means interconnecting said frame and said feed means and being operative to apply a predetermined uniform biasing force to said frame causing said drill steel and bit to be pressed axially against the bottom of a hole being drilled.

4. The drill apparatus of claim 3 wherein: said annular bit includes cutting inserts mounted in its outer cutting face with some inserts projecting radially inwardly beyond the inside of said bit and other inserts projecting radially outwardly beyond the outside of said bit.

5. A compressed air actuated core drill comprising: a body; an elongated tubular shaft member having one end slidably mounted on said body and carrying an annular bit at its other end; a tubular reciprocating piston slidably mounted on said body for applying a rapid series of axially directed percussive impacts to said one end of said tubular shaft member; means for reciprocating the piston; a tube fixed on said body and extending axially through said piston in sliding relationship; said shaft member, bit and tube being axially aligned and forming an axial passageway extending through the bit, shaft member and tube for receiving a core of earth which remains as said bit cuts an annular trench encircling said core; and means on said body for slowly rotating said shaft member and bit simultaneously with the application of said percussive impacts to said shaft member by said piston.

6. The core drill of claim 5 including: means connected to said body operative to apply a uniform, substantially non-varying, and selectively adjustable force to said shaft member causing said bit to be pressed axially against the bottom of the annular trench being cut by said bit.

References Cited in the file of this patent

UNITED STATES PATENTS

| 766,588 | Brejcha | Aug. 2, 1904 |
| 2,492,158 | Le Compte et al. | Dec. 27, 1949 |
| 2,537,605 | Sewell | Jan. 9, 1951 |
| 2,810,549 | Morrison | Oct. 22, 1957 |
| 2,985,249 | Beaumont | May 23, 1961 |
| 2,998,086 | Demo | Aug. 29, 1961 |
| 3,011,570 | Kurt et al. | Dec. 5, 1961 |
| 3,074,381 | Osgood | Jan. 22, 1963 |

FOREIGN PATENTS

| 168,284 | Germany | Mar. 7, 1906 |
| 330,633 | Italy | Oct. 21, 1935 |